A. SUNDH.
HYDRAULIC VARIABLE SPEED GEAR.
APPLICATION FILED FEB. 20, 1909.
1,047,328.
Patented Dec. 17, 1912.
3 SHEETS—SHEET 1.
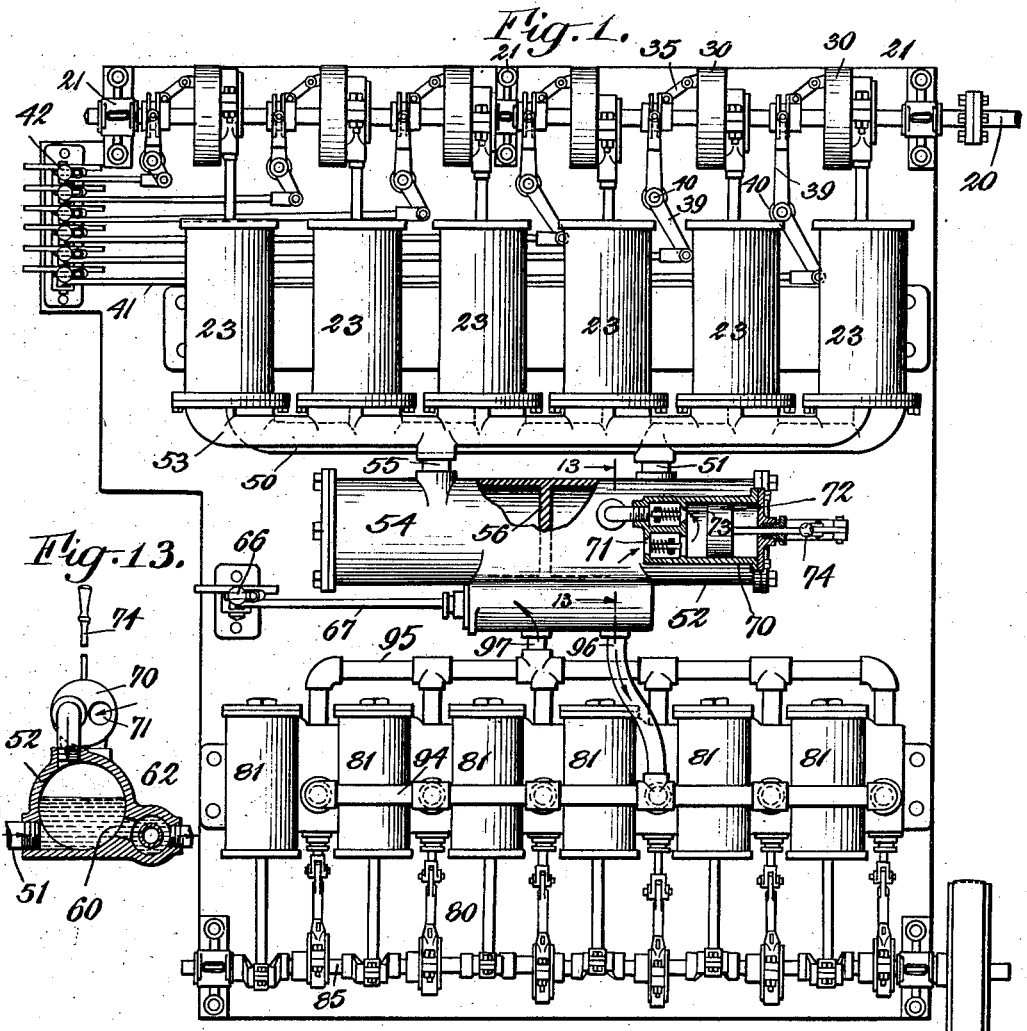
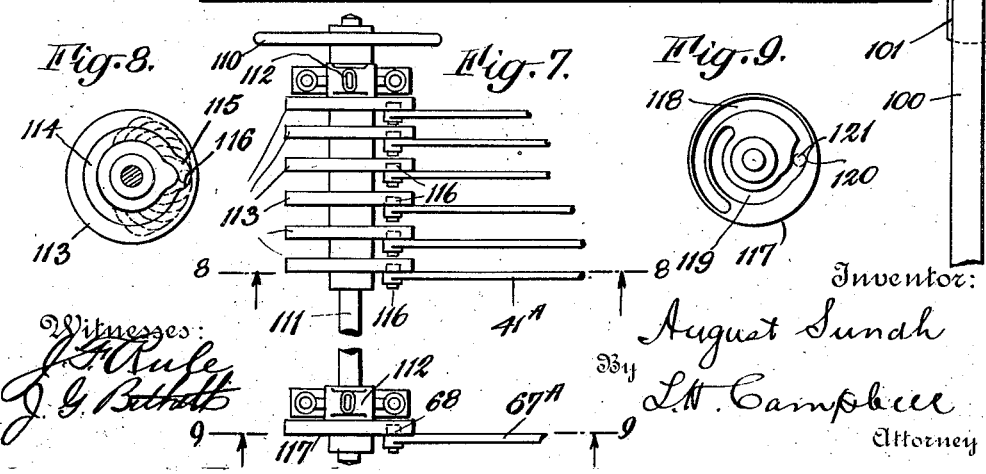

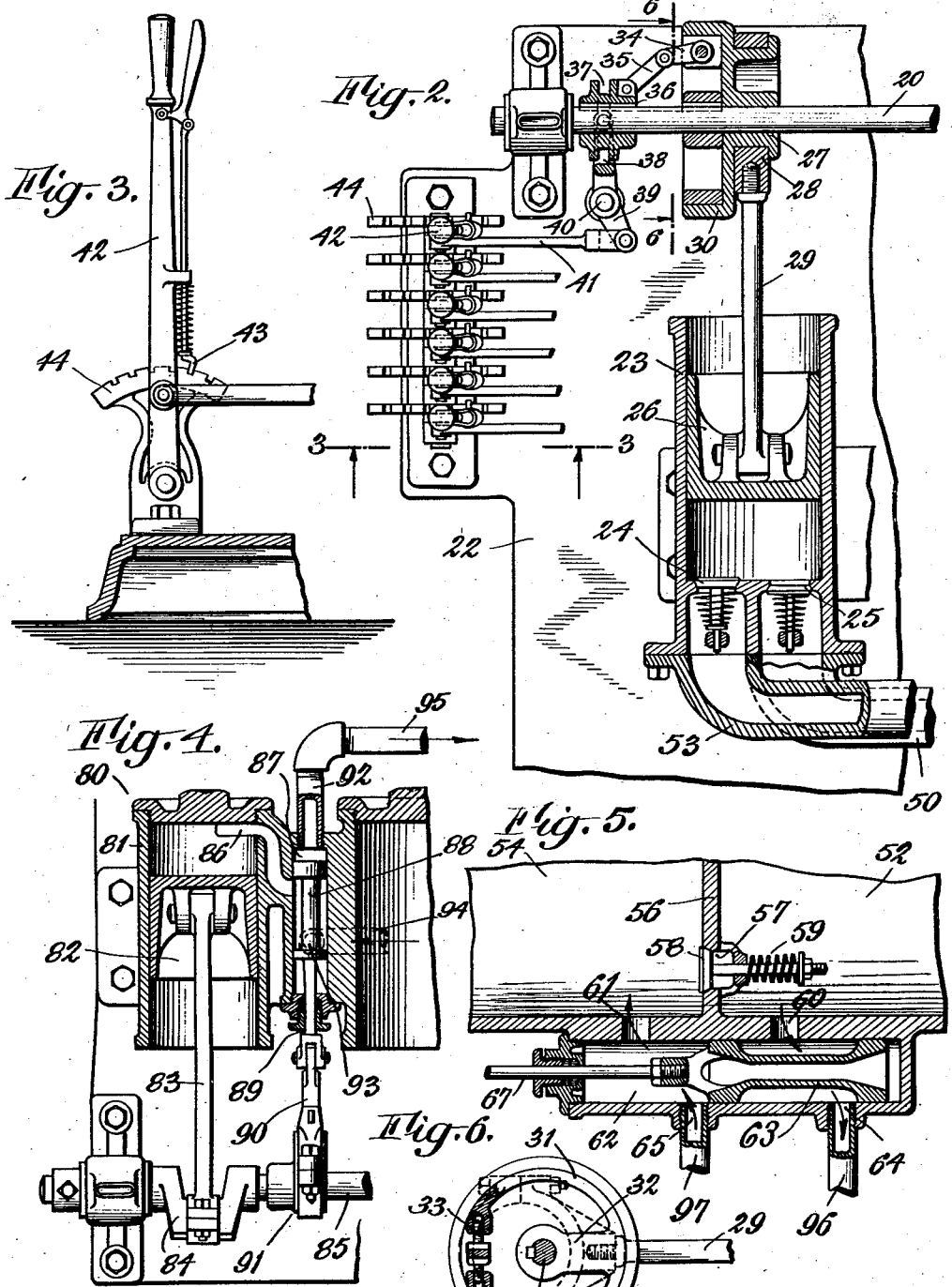

A. SUNDH.
HYDRAULIC VARIABLE SPEED GEAR.
APPLICATION FILED FEB. 20, 1909.
1,047,328.
Patented Dec. 17, 1912.
3 SHEETS—SHEET 3.
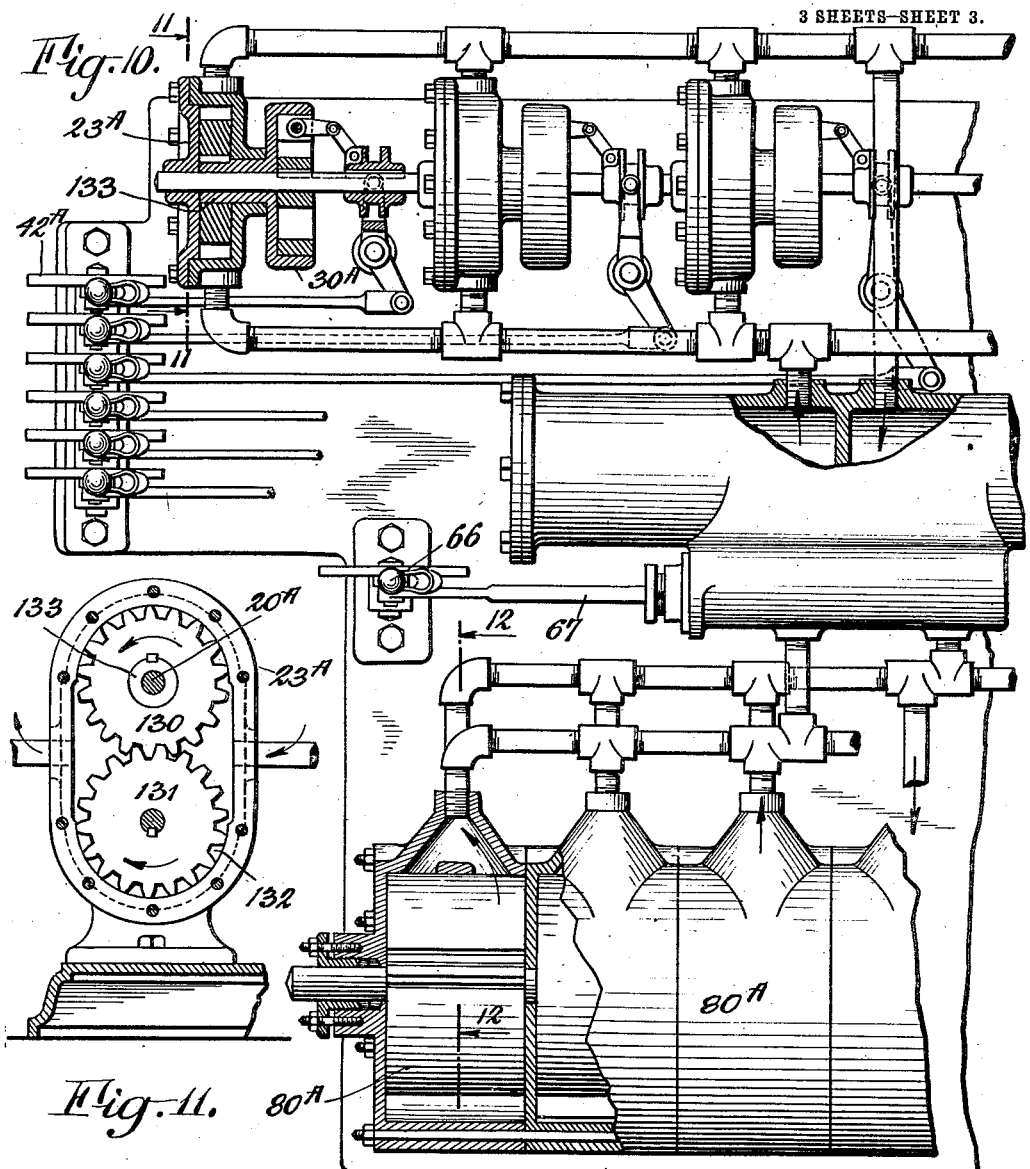
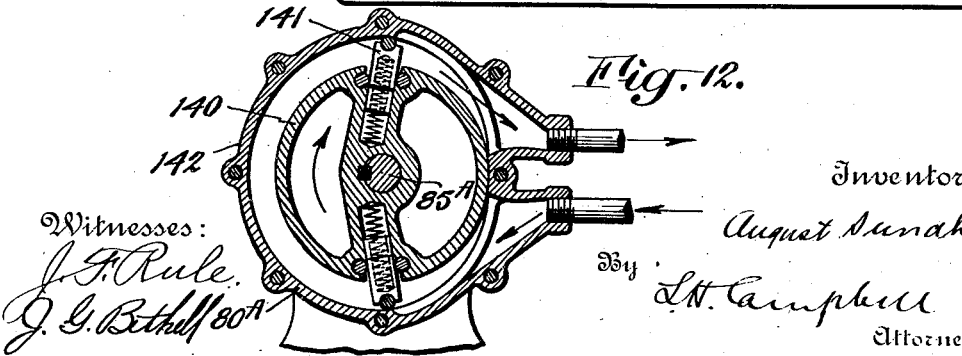
Witnesses:
J. F. Rule.
J. G. Bethell.
Inventor:
August Sundh
By L. H. Campbell
Attorney

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

HYDRAULIC VARIABLE-SPEED GEAR.

1,047,328.  Specification of Letters Patent.  Patented Dec. 17, 1912.

Application filed February 20, 1909. Serial No. 479,086.

*To all whom it may concern:*

Be it known that I, AUGUST SUNDH, a citizen of the United States, residing at Yonkers, in the county of Westchester and State of New York, have invented a new and useful Improvement in Hydraulic Variable-Speed Gear, of which the following is a specification.

My invention relates to a system for transmitting power from a prime mover to a driven member in which a fluid under pressure is used as the power transmitting medium. Suitable devices driven by the prime mover impart energy to the fluid which, in turn, through proper means, delivers the energy to the driven member.

The object of the invention is to provide a power transmission system of great flexibility and ease of control without sacrifice of efficiency, and one which may be operated by an unskilled person without danger of injury to the mechanism.

I will describe my invention in the following specification and point out the novel features thereof in the appended claims.

Referring to the drawings, Figure 1 is a plan view of a transmission mechanism embodying my invention. Fig. 2 is a plan view, on an enlarged scale, of a portion of the mechanism shown in Fig. 1, one of the pumps and its driving eccentric and clutch being shown in section. Fig. 3 is a section on the line 3—3 of Fig. 2, showing the construction of the clutch-operating levers. Fig. 4 is a view similar to Fig. 2 showing one of the hydraulic motors and its valve, and a portion of the cylinder of a second motor in section. Fig. 5 is a sectional plan view of the reversing valve and portions of the pressure and discharge tanks, showing the relief valve. Fig. 6 is a section, taken approximately on the line 6—6 of Fig. 2, illustrating the construction of the clutches. Fig. 7 is a plan view of a modified form of controller for changing the speed and direction of transmission. Fig. 8 is a section on the line 8—8 of Fig. 7 showing the construction of the clutch-operating cams. Fig. 9 is a section on the line 9—9 of Fig. 7, showing the reversing cam. Fig. 10 is a plan view of a modified form of transmission mechanism, using pumps and motors of rotary type, parts being shown in section. Fig. 11 is a section on the line 11—11 of Fig. 10, showing the construction of the pumps. Fig. 12 is a section on the line 12—12 of Fig. 10, showing the construction of the motors. Fig. 13 is a section of the pressure tank and reversing valve taken on the line 13—13 of Fig. 1.

Like characters of reference designate corresponding parts in all of the figures.

Referring to the embodiment of my invention shown in Figs. 1, 2, 3, 4, 5, 6 and 13, the numeral 20 designates a shaft driven directly or through gearing from a source of power (not shown) and which will be hereinafter spoken of as the driving shaft or prime mover. This shaft turns in bearings 21, mounted on the bed-plate 22. 23 are a series of pump cylinders, each provided with suitable inlet and outlet valves 24 and 25, respectively, and in each of which works a plunger 26. For driving the plunger I provide upon the shaft 20 a series of eccentrics 27, connected to their respective plungers by means of eccentric straps 28 and rods 29. The eccentrics are loosely mounted on the shaft 20 but are provided with clutch drums 30 adapted to have expanded within them split clutch-rings 31 carried by arms 32 keyed to the shaft. For operating the clutches the ends of each split clutch-ring are connected by a turnbuckle 33 which may be given a partial rotation by means of an arm 34 projecting therefrom, which is connected by a toggle-link 35 to a sliding block 36 splined to the shaft 20. Each of the sliding blocks is provided with an annular groove 37 which is engaged by a yoke 38 on the end of a lever 39. The levers 39 are pivoted to turn about studs 40 and are connected by links 41 to hand levers 42. Each hand-lever may be provided with a pawl 43 engaging a fixed segment 44 for locking in desired position.

The outlet ports of the several cylinders are connected to a pressure header 50 which discharges through a connection 51 into the pressure chamber 52. The inlet ports of the cylinders connect with an inlet header 53 which communicates with the discharge tank 54 through the connecting pipe 55. The pressure and discharge tanks 52 and 54 are preferably opposite ends of a single cylinder divided transversely by a diaphragm 56 in which is an opening 57 normally closed by the relief valve 58. The valve is held on its seat by a spring 59, the strength of which is adjusted to permit the valve to open when the pressure in the pressure chamber exceeds a safe limit, thus allowing fluid to flow directly from the pressure to the discharge chamber without passing through the motors.

Connected with the pressure tank by a port 60, and with the discharge tank by a port 61 is a valve chamber 62 in which slides a reversing valve 63 which may be of the piston type. The valve chamber has ports 64 and 65 for connection with the motor. For operating this valve a lever 66 is provided connected with the valve stem 67. The operation of the valve is obvious. In the position shown, ports 60 and 64 are in communication, and there is an unobstructed flow from port 65 around the end of the valve to port 61. If the valve be now moved to middle position, ports 64 and 65 will both be closed. To reverse, the valve is moved to the left to its extreme position, when the flow will be from port 60 around the valve piston to port 65, the return flow being from port 64 through the piston.

To equalize the pressure of the fluid coming from the pumps 23, and to provide for an even and steady flow and to take up shocks, it is desirable that there be sufficient air in the pressure chamber 52, above the transmission fluid, to form a cushion. An air pump may be provided for forcing into the chamber the proper amount of air. This pump comprises a cylinder 70 having inlet and discharge valves 71 and 72, respectively, in which reciprocates a piston 73 operated by a hand-lever 74.

80 designates a motor arranged to be driven by the fluid pressure from the pumps. As shown, this motor comprises a plurality of cylinders 81, in each of which is a reciprocatory piston 82. Piston rods 83 connect the pistons with cranks 84, formed in the driven shaft 85 and disposed at proper angular intervals about the same to equalize the torque. The cylinders are single-acting, each having a single inlet and discharge port 86 leading to a valve chamber 87. The admission of the operating fluid to this port is controlled by a piston valve 88 driven through a stem 89 and connecting rod 90 from an eccentric 91 fixed to the shaft 85. The several valve chambers are connected by pipes 92 and 93 to supply and discharge pipes 94 and 95, respectively. A pipe 96 leads from the port 64 in the casing of the reversing valve to the supply pipe 94, and a pipe 97 connects the port 65 and pipe 95. When the reversing valve is moved over to the left it reverses the direction of flow of fluid to the motor, and consequently the motor 80 and the driven shaft 85 will rotate in the opposite direction. Power may be taken from the shaft 85 by any suitable means as by belt 100 running over pulley 101. The parts are all shown as supported on the same bed-plate 22, though it is obvious that the pressure and discharge tanks and motor may be located at any distance from each other so long as they are suitably connected by pipes.

The operation of the mechanism will be apparent from the foregoing description. When it is desired to transmit power from the prime mover or rotating driving shaft 20 to the driven shaft 85, one of the levers 42 is thrown over to operate a clutch to secure its eccentric to the shaft. This starts one of the pumps 23 which forces the transmitting fluid through the pressure tank and motor back through the discharge tank and again to the pump. When but one pump is in operation, all the power of the shaft 20 will be expended in driving it. Consequently the supply of fluid delivered to the motor will be small, but its pressure will be great. The motor will then rotate the shaft 85 at a slow speed but with a very great torque. By connecting more of the pumps with the driving shaft the volume of fluid delivered by the pumps will be increased and the motor will operate at higher speed. As the power delivered by the shaft 20, which may be constant, is now divided up among several pumps, the pressure of the fluid will be correspondingly decreased. It will thus be seen that the speed of the driven shaft and the torque with which it is driven may be varied within the limits of the mechanism by simply clutching in a desired number of the pumps. The pumps and their operating mechanisms are entirely independent of each other and may be freely connected or disconnected at any time without the possibility of injury to the apparatus. The motor may be stopped either by disconnecting all of the pumps or by throwing the reversing valve to middle position, in which case the fluid pumped will pass directly from the pressure chamber to the discharge chamber through the relief valve. The former method is preferable, when the period of stoppage is to be considerable as the pumps are idle, while the latter method has the advantage of greater quickness and of absolutely holding the motor against movement if an incompressible fluid is used. The motor may be reversed at any time in the manner already explained, without reference to the speed regulating means.

In Figs. 7, 8 and 9 is shown a controller which may be operated by a simple hand-wheel 110 and may be used instead of clutch levers 42 and reversing lever 66. In this case a shaft 111, journaled in bearings 112, carries the hand-wheel 110 and has affixed thereto a series of cams 113, one for operating each clutch. Each of these cams has a cam groove in one face thereof comprising a portion of smaller radius 114 and a portion of greater radius 115 as shown in Fig. 8. In the first one of the cams the grooved portion is relatively short as shown in full lines, while in each succeeding cam this portion is lengthened equally in each direction as indicated by the dotted lines. Each clutch connecting rod 41^A is provided at its end with a transverse stud 116 engaging with one of the cam grooves. When the stud is in the portion 115 of its cam the clutch which it controls will be out of operation and the corresponding pump idle, but when the cam is rotated to cause the portion 114 to engage with the stud, the link 41^A will be drawn toward the shaft 111, thus throwing in its clutch and starting the pump.

For operating the reversing valve there is affixed to the shaft 111 a cam 117 which is provided with a cam groove of the form shown in Fig. 9. This groove has a long portion of large radius 118, a long portion of small radius 119, and a short intermediate connecting portion 120. A stud 68 carried by the valve stem 67^A engages with the walls of this cam groove.

In operation, supposing the cams to be in the positions illustrated in Figs. 8 and 9, the pumps will all be disconnected and the reversing valve will be in its middle position, cutting off communication to the motor. Now when the hand-wheel is rotated to the right, the groove portion 118 will engage the stud 121, and will throw the valve to its extreme right-hand position. As the remainder of the groove 118 is of the same radius, the further rotation of the cam will not change the position of the reversing valve. At the same time that the valve is thrown, the groove portion 114 of the first of the cams 113 will engage the stud 116 of the first clutch connecting rod 41^A, thus throwing in the clutch and starting the first pump. This starts the motor at slow speed. Further rotation of the hand-wheel throws in the remaining clutches one at a time, successively starting the pumps, and gradually increasing the speed of the motor at the expense of its torque. Returning the hand-wheel to the left cuts out the pumps one after another, reducing the speed of the motor and eventually stopping the pumps and the motor, and centering the reversing valve. If the hand-wheel is rotated to the left, beyond the original position, the stud 68 will enter the groove portion 119 of the cam-plate 111 and cause the reversing valve to be drawn into its extreme left-hand position. The motor will in this case be started in the opposite direction and its speed increased in proportion to the amount the hand-wheel is turned.

In Figs. 10, 11 and 12 I have shown a modified form of my transmission system in which rotary pumps 23^A of any approved construction are substituted for the reciprocatory pumps of the form shown in Figs. 1 and 2, and a series of rotary motors 80^A for the reciprocating motor 80. The principle of operation of the system is not changed. The form of pump shown comprises a pair of intermeshing gears 130 and 131 in a closely fitting casing 132. The gear 130 is keyed to a sleeve 133, loosely mounted on the prime mover shaft 20^A and carrying a clutch housing 30^A adapted to be clutched to the shaft by suitable mechanism operated by the lever 42^A.

A motor of the reciprocatory type, such as is shown in Fig. 1 or any other desired form of motor, may of course be used with this rotary pumping apparatus, but I prefer to use a rotary motor or series of motors of some suitable construction such as that shown in Fig. 12. In this construction a cylindrical drum 140 is secured to the driven shaft 85^A. This drum carries movable blades 141 and is arranged to be rotated by the fluid under pressure in casing 142. The connections between the pumps and motors in this form of my apparatus are substantially the same as those fully described in connection with the form of pump and motor shown in Fig. 1 so that it will not be necessary to describe them again.

I have described certain specific embodiments of my invention for purposes of illustration, but it is obvious that my invention is not limited to these forms. For example, I may use any type of pumping apparatus either reciprocatory or rotary, or may have some of its parts of one type and some of another. The number of pump cylinders used will vary with the character of work to be performed. A number of such pumps as I have shown may be used if desired. The number of speed adjustments may be increased indefinitely by simply dividing the pumping apparatus into a greater number of parts. The pump elements need not be driven from a single shaft, but power may be transmitted to them from the prime mover in any suitable manner. When clutches are used they may be of any desired type, such as the mechanically operated ones shown, or they may be operated electromagnetically or by fluid pressure. In like manner, the type and number of elements of the motor may be varied. I prefer to interpose between the pump and motor the pressure and discharge tanks as described, but these are not essential, and the fluid may be made to pass directly from the pump to the motor.

Other changes, to suit the particular application, will suggest themselves to any one skilled in the art.

By the arrangement of parts herein disclosed a variable speed gear controlled by clutches is shown in which there can be no interference between the different clutches. In other devices of this class it is necessary to release each clutch as the next clutch is actuated. These arrangements are troublesome as it frequently happens that more than one of the clutches become thrown in at the same time, and as they are not designed to work together, this subjects the mechanisms which they control to abnormal strains and often causes serious accidents. In my device there is but little wear on the clutches. By combining this multiple clutch with fluid transmission means I am able to produce desired changes in speed and in driving torque in a simple and efficient manner, and by the use of a mechanism which cannot become easily deranged.

With this mechanism a skilled operator is not needed. No power is required of the prime mover while the driven mechanism is at rest, but its full power is available at times to drive a load at any desired speed. Its efficiency is increased by the fact that its various parts are at rest, except those which at any step of the operation are doing useful work.

What I claim is:—

1. In a power transmission system, a shaft arranged to be driven by a prime mover, a pump comprising a plurality of pumping members, a single device for connecting any desired number of said pumping members with said shaft, a fluid pressure motor, means for conducting fluid from the pump to the motor, means for returning fluid from the motor to the pump, and means for reversing the motor.

2. In a power transmission system, a shaft arranged to be driven by a prime mover, a pump comprising a plurality of pumping members, a single device for connecting any desired number of said pumping members with said shaft, a fluid pressure motor, means for conducting fluid from the pump to the motor, means for returning fluid from the motor to the pump, and a reversing valve arranged to reverse the direction of flow of fluid through said connections, to thereby reverse the direction of rotation of the motor.

3. In a power transmission system, a shaft arranged to be driven by a prime mover, a pump comprising a plurality of pumping members, a clutch for each of the pumping members for connecting a desired number of said members with the shaft, a device for successively operating the clutches, a fluid pressure motor, and means for conducting fluid to and from the pump and the motor.

4. In a power transmission system, a driving shaft, a pump comprising a plurality of pumping members, a plurality of clutches, a single means for actuating said clutches to connect a desired number of pumping members with the shaft, a fluid pressure motor, and means for conducting fluid to and from the pump and the motor.

5. In a power transmission system, a driving shaft, a driven shaft, a pump comprising a plurality of pumping members, means including a friction clutch for driving each pumping member from the driving shaft, a device for actuating said clutches, a motor arranged to be actuated by fluid from said pump for driving the driven shaft, and fluid connections between said pump and said motor.

6. In a power transmission system, a driving shaft, a driven shaft, a pump comprising a plurality of cylinders, a reciprocatory piston within each cylinder, a plurality of eccentrics loosely mounted on the driving shaft, connections between said eccentrics and said pistons, a plurality of clutches for connecting and disconnecting said eccentrics with and from said driving shaft, a device for operating the clutches, fluid pressure means for rotating the driven shaft, and means for conducting fluid from said pumps to said fluid pressure means.

7. In a power transmission system, a driving shaft, a driven shaft, a pump comprising a plurality of cylinders, a reciprocatory piston within each cylinder, means for driving each piston, said means comprising an eccentric loosely mounted upon the driving shaft, a strap surrounding said eccentric, a connecting rod from said strap to the piston, said eccentric being constructed to form a clutch-drum having an internal friction face, a split ring secured to the shaft within the clutch-drum, and means for expanding said ring into engagement with the friction face of said drum; a fluid pressure motor for driving the driven shaft, and means for conducting fluid from the pump to the motor.

8. In a power transmission system, a driving shaft, a driven shaft, pump comprising a plurality of cylinders, a reciprocatory piston within each cylinder, means for driving each piston, said means comprising an eccentric loosely mounted upon the driving shaft, connections between the eccentric and one of the pistons, said eccentric being constructed to form a clutch-drum having an internal friction surface concentric with the driving shaft, a split clutch ring secured to the shaft, a right and left-hand screw connecting the ends of said clutch ring for expanding said ring within the clutch-drum, levers for rotating said screw, a grooved collar slidably mounted upon the driving shaft, and supporting one end of each of said levers, a pivoted arm engaging the groove of said collar, a rod for operating said pivoted arm, and means for operating said rod; a fluid pressure motor for driving the driven shaft, and means for conducting fluid from the pump to the motor.

9. In a power transmission system, a shaft arranged to be driven by a prime mover, a pump comprising a plurality of pumping members, a clutch for each of said pumping members for connecting said members with the shaft, a fluid pressure motor, means for conducting fluid from the pump to the motor, and a controlling device for said clutches.

10. In a power transmission system, a shaft, arranged to be driven by a prime mover, a pump comprising a plurality of pumping members, a clutch for each of said pumping members for connecting a desired number of said members with the shaft, a fluid pressure motor, means for conducting fluid from the pump to the motor, a controlling device for the clutches, and connections between said controller and each of the clutches whereby a desired number of the pumping members may be connected with the shaft to thereby vary the speed and torque at which the motor is driven.

11. In a power transmission system, a shaft arranged to be driven by a prime mover, a pump comprising a plurality of pumping members, a clutch for each of said members for connecting said members with the shaft, a fluid pressure motor, means for conducting fluid from the pump to the motor, a reversing valve for reversing the direction of flow of fluid through the motor, and a controlling device for operating said clutches and said reversing valve.

12. In a power transmission system, a shaft arranged to be driven by a prime mover, a pump comprising a plurality of pumping members, a clutch for each of said members for connecting said members with the shaft, a fluid pressure motor, means for conducting fluid from the pump to the motor, and a manually operated controlling device arranged to successively operate said clutches.

13. In a power transmission system, a shaft arranged to be driven by a prime mover, a pump comprising a plurality of pumping members, a clutch for each of said members for connecting said members with the shaft, a fluid pressure motor, means for conducting fluid from the pump to the motor, a valve for reversing said motor, and a manually operated controlling device, said controlling device comprising a shaft, a series of cams on said shaft, an operative connection between some of the cams and each clutch, and between one of the cams and the reversing valve.

14. In a power transmission system, a shaft arranged to be driven by a prime mover, a pump comprising a plurality of pumping members, a clutch for each of said members for connecting said members with the shaft, a fluid pressure motor, means for conducting fluid from the pump to the motor, a manually operated controlling device for controlling the operation of said clutches, said controlling device comprising a series of cams, one for each of the clutches, operative connections between each cam and its respective clutch, each cam being arranged to throw its clutch into or out of engagement, the cams being fixed in such relation that each cam has a lead over the preceding cam, and means for simultaneously operating said cams, whereby the clutches will be successively engaged or disengaged.

15. In a power transmission system, a shaft arranged to be driven by a prime mover, a pump comprising a plurality of pumping members, a clutch for each of said pumping members for connecting said pumping members with the shaft, a fluid pressure motor, means for conducting fluid from the pump to the motor, a valve for controlling the flow and direction of flow of fluid to said motor, a manually operated controlling device comprising a shaft, and means for rotating said shaft; a series of clutch-operating cams affixed to the shaft, connections between each cam and one of said clutches, each of the clutch operating cams having an angular lead over the next succeeding cam, connections between one of said cams and the valve, said cam having an operative face for holding said valve in forward position, another for holding said valve in reverse position, and a third intermediate face for holding said valve in closed position.

16. In a power transmission system, a shaft arranged to be driven by a prime mover, a pumping apparatus driven by said shaft, a fluid pressure motor having interchangeable inlet and discharge ports, a casing constructed to form a pressure chamber, a discharge chamber, and a valve chamber; connections between the pumping apparatus and said chambers, connections between said chambers and the motor ports, and a piston valve in the valve chamber arranged to reverse the connections between said chambers and the motor ports.

17. In a power transmission system, a driving shaft, a driven shaft, a plurality of members for transmitting power from the driving shaft to the driven shaft, means for increasing the speed of transmission by connecting a larger number of said members with the driving shaft, means for decreasing the speed of transmission and increasing the torque by reducing the number of members connected with the driving shaft, and a controlling device arranged to connect said members successively with the driving shaft, and to disconnect said members successively from the driving shaft.

18. In a power transmission system, a driving shaft, a driven shaft, means including a plurality of clutches for driving the driven shaft from the driving shaft at different rates of speed, and a controller arranged, when moved in one direction, to successively and cumulatively connect said clutches, and when returned to its first position, to successively disconnect said clutches.

19. In a power transmission system, a driving shaft, a driven shaft, means including a plurality of clutches for driving the driven shaft from the driving shaft at different rates of speed and in opposite directions, and a controlling device arranged, when moved in one direction, to successively and cumulatively connect said clutches to cause the driven shaft to be rotated in one direction at increasing rates of speed, and when returned to its original position, to successively disconnect said clutches to decrease the speed of the driving shaft, and when moved in the opposite direction, to cause the driven shaft to be rotated in the opposite direction at different rates of speed.

In testimony whereof, I have signed my name to this specification in the presence of two subscribing witnesses.

AUGUST SUNDH.

Witnesses:
ROGER W. FLAGG,
H. J. HUMISTON.